(12) United States Patent
Fumagalli et al.

(10) Patent No.: US 11,904,345 B2
(45) Date of Patent: Feb. 20, 2024

(54) CONTROL METHOD OF AN ELECTROMECHANICAL APPARATUS FOR INSTALLING A PLUNGER TIP IN A SYRINGE

(71) Applicants: STERILINE S.R.L., Como (IT); ISS—INNOVATIVE SECURITY SOLUTIONS S.R.L., Lomazzo (IT)

(72) Inventors: Federico Fumagalli, Como (IT); Remo Sala, Lomazzo (IT); Alessandro Caprioli, Lomazzo (IT); Tommaso Cavandoli, Sesto San Giovanni (IT); Lorenzo Curioni, Alzate Brianza (IT)

(73) Assignees: STERILINE S.R.L., Como (IT); ISS—INNOVATIVE SECURITY SOLUTIONS S.R.L., Lomazzo (IT)

( * ) Notice: Subject to any disclaimer, the term of this patent is extended or adjusted under 35 U.S.C. 154(b) by 0 days.

(21) Appl. No.: 17/901,553

(22) Filed: Sep. 1, 2022

(65) Prior Publication Data
US 2023/0074543 A1 Mar. 9, 2023

(30) Foreign Application Priority Data
Sep. 2, 2021 (EP) .................................... 21194596

(51) Int. Cl.
*B05C 17/005* (2006.01)

(52) U.S. Cl.
CPC .............................. *B05C 17/00576* (2013.01)

(58) Field of Classification Search
CPC ......... B65B 7/2821; B65B 57/02; G01L 5/00; G01L 5/0061; G01L 5/0076;
(Continued)

(56) References Cited

U.S. PATENT DOCUMENTS

| 4,511,044 A | 4/1985 | Connor et al. |
| 5,519,984 A | 5/1996 | Beussink et al. |

(Continued)

FOREIGN PATENT DOCUMENTS

| AU | 2007203388 A1 * | 8/2007 | .......... A61M 5/1456 |
| CA | 2554503 * | 6/2009 | |

(Continued)

OTHER PUBLICATIONS

Extended European Search Report dated Apr. 13, 2023 in connection with corresponding European Patent Application No. 22192645.
(Continued)

*Primary Examiner* — Bob Zadeh
(74) *Attorney, Agent, or Firm* — Akerman LLP (57) ABSTRACT

A control method of an electromechanical apparatus (10) for installing a plunger tip (31) in a syringe (21), the control method comprising: providing a syringe (21) with at least one opening (22); providing a plunger tip (31) configured for snug insertion in the opening (22); pushing the plunger tip (31) inside the syringe (21), by a pusher rod (60) of the electromechanical apparatus (10), the plunger tip (31) passing through an intermediate cannula element (50); monitoring over time a force exchanged between the plunger tip (31) and the pusher rod (60), providing a force signal (401, 402, 403, 404) by a force detector (61) of the electromechanical apparatus (10); analyzing the force signal (401, 402, 403, 404) to determine an installation status of the plunger tip (31) in the syringe (21).

16 Claims, 4 Drawing Sheets

(58) Field of Classification Search
CPC ........ G01M 99/007; B67B 1/04; B67B 3/261; B67B 3/264; B67B 3/265; B05C 17/00576
See application file for complete search history.

(56) References Cited

U.S. PATENT DOCUMENTS

| | | | |
|---|---|---|---|
| 6,164,044 A | 12/2000 | Porfano et al. | |
| 6,264,066 B1* | 7/2001 | Vincent | A23G 9/228 222/105 |
| 2001/0056233 A1* | 12/2001 | Uber, III | A61B 8/06 600/431 |
| 2003/0229311 A1* | 12/2003 | G. Morris | A61M 5/1458 604/151 |
| 2005/0177322 A1 | 8/2005 | Cosentino et al. | |
| 2007/0204930 A1* | 9/2007 | Phallen | B67D 1/0888 222/394 |
| 2009/0223592 A1 | 9/2009 | Procyshyn et al. | |
| 2017/0157638 A1* | 6/2017 | Beebe | B05C 17/00553 |
| 2017/0182252 A1* | 6/2017 | Hamel | B65B 7/2821 |
| 2023/0074543 A1* | 3/2023 | Fumagalli | B05C 17/00576 |

FOREIGN PATENT DOCUMENTS

| | | | |
|---|---|---|---|
| CN | 104602738 | * | 5/2015 |
| EP | 0892918 | A1 | 1/1999 |
| JP | 2003054694 | * | 2/2003 |
| JP | 2008229313 | * | 10/2008 |

OTHER PUBLICATIONS

European Search Report dated Feb. 16, 2022 in connection with corresponding European Patent Application No. 21194596.

* cited by examiner

CONTROL METHOD OF AN ELECTROMECHANICAL APPARATUS FOR INSTALLING A PLUNGER TIP IN A SYRINGE

CROSS-REFERENCE TO RELATED APPLICATIONS

The present application claims priority to European Patent Application No. 21194596.9, filed on Sep. 2, 2021, the entirety of which is incorporated herein by reference.

FIELD OF THE INVENTION

The present invention relates to a control method of an electromechanical apparatus, wherein the electromechanical apparatus is configured for installing a plunger tip in a syringe.

In general, the present invention relates to controlling an installation process of a bung element in a pharmaceutical container, wherein the bung element is adapted for corking the pharmaceutical container. The electromechanical apparatus may be configured for further actions on or associated with the pharmaceutical container, such as filling, labeling, packaging, and others.

The present invention finds application in the automation field, directed to containers of pharmaceutical preparations.

BACKGROUND ART

In the pharmaceutical field, pre-sterilized containers such as syringes (but also: containers, cartridges and others) are increasingly used; pre-sterilized containers allow pharmaceutical makers to avoid managing a dedicated sterilization process.

The pre-sterilized containers are supplied in hermetic sealed packaging and positioned in plastic tray supports (commonly called "nest-and-tub" supports or simply nests) equipped with suitable housings.

The pharmaceutical containers are then filled with the pharmaceutical preparation and closed with an appropriate plunger tip or bung or cork or stopper, which in particular prevents the content of the container to spill out.

An example of electromechanical apparatus for handling and processing of pharmaceutical containers is given in document US2009223592 (A1), which relates to a robotic filling system for filling containers with a pharmaceutical product.

The quality of the closing process ("corking") of the container with the plunger tip, bung, cork or stopper is crucial for the quality of the entire packaging process associated with the pharmaceutical container.

Document U.S. Pat. No. 6,164,044 (A) relates to pre-fillable medical containers, such as syringe barrels and syringe tip closures, which are introduced into a housing assembly where the syringe barrels and tip closures are cleaned with filtered ionized air and the tip closures are coupled to the barrels.

The solutions of the prior art present disadvantages in effectively determining whether a closing element, such as plunger tip or bung or cork or stopper, has correctly reached its closing position in a pharmaceutical container.

It is an objective of the present invention to solve drawbacks of the prior art.

In particular, it is an object of the present invention to improve closing or corking of a pharmaceutical container of the syringe type with a bung element of the plunger tip type.

It is a further object of the present invention to provide a control method of an electromechanical apparatus which is improved with respect to prior art solutions.

It is a further object of the present invention to install a bung element of the plunger tip type in a pharmaceutical container of the syringe type in a more reliable manner.

It is a further object of the present invention to control the quality of corking or closing of a pharmaceutical container.

SUMMARY OF THE INVENTION

These and other objects of the present invention are achieved by a control method of an electromechanical apparatus for installing a plunger tip in a syringe, according to the features set out in the appended claims which are an integral part of the present description.

According to a preferred embodiment, the control method is embodied in an electromechanical apparatus, and controls installation of a bung element in a pharmaceutical container, in particular of a plunger tip in a syringe.

The control method comprises providing a syringe comprising at least one opening.

The control method comprises providing a plunger tip configured for snug insertion in the opening of a syringe.

The control method comprises pushing the plunger tip at least partially inside the syringe, by a pusher rod of the electromechanical apparatus.

The control method comprising passing the plunger tip through an intermediate cannula element.

The control method comprises monitoring over time a force exchanged between the plunger tip and the pusher rod, thus providing a force signal by a force detector of the electromechanical apparatus.

The control method comprises analyzing the force signal of the force exchanged between the plunger tip and the pusher rod, to determine an installation status of the plunger tip in the syringe.

Advantageously, the control method of the present invention allows improved closing or corking of a syringe with a plunger tip installed by an electromechanical apparatus.

Advantageously, monitoring over time the force exchanged between the plunger tip and the pusher rod allows to install in a more reliable manner the bung element of the plunger tip type in a pharmaceutical container of the syringe type.

Advantageously, analyzing the force signal of the force exchanged between the plunger tip and the pusher rod allows controlling the quality of corking or closing of the pharmaceutical container with a bung element.

Advantageously, the control method allows verification of the presence of the plunger tip in the syringe, and possibly further verification of a correct positioning of the plunger tip.

Preferably, analyzing the force signal associated to the force exchanged between the plunger tip and the pusher rod comprises detecting a force peak, and/or detecting a decreasing force and/or detecting an initial impulse. Advantageously, the detection of these force features allows better control of the quality of corking or closing of the pharmaceutical container with a bung element.

Preferably, the force detector is provided in the pusher rod, determining the force by detecting a compressive strain of the pusher rod. Advantageously, to increase accuracy and efficacy the force detector comprises semiconductor strain gauges, preferably arranged as a Wheatstone bridge circuit, applied to the pusher rod.

In the preferred embodiment, the pharmaceutical container is a syringe, and the bung element is a plunger tip, pushed inside the syringe passing through an intermediate cannula element. Advantageously, the present invention is more reliable and effective for controlling a process involving pharmaceutical syringes.

Other features and advantages of the invention will be apparent from the following description of preferred embodiments, and from the claims.

BRIEF DESCRIPTION OF THE DRAWINGS

The invention will be now described with reference to the annexed drawings, provided as non-limiting examples of preferred embodiments, wherein.

In the drawings referred to in the description, the same reference numerals will designate the same or equivalent elements.

DETAILED DESCRIPTION OF THE INVENTION

Figure 1:
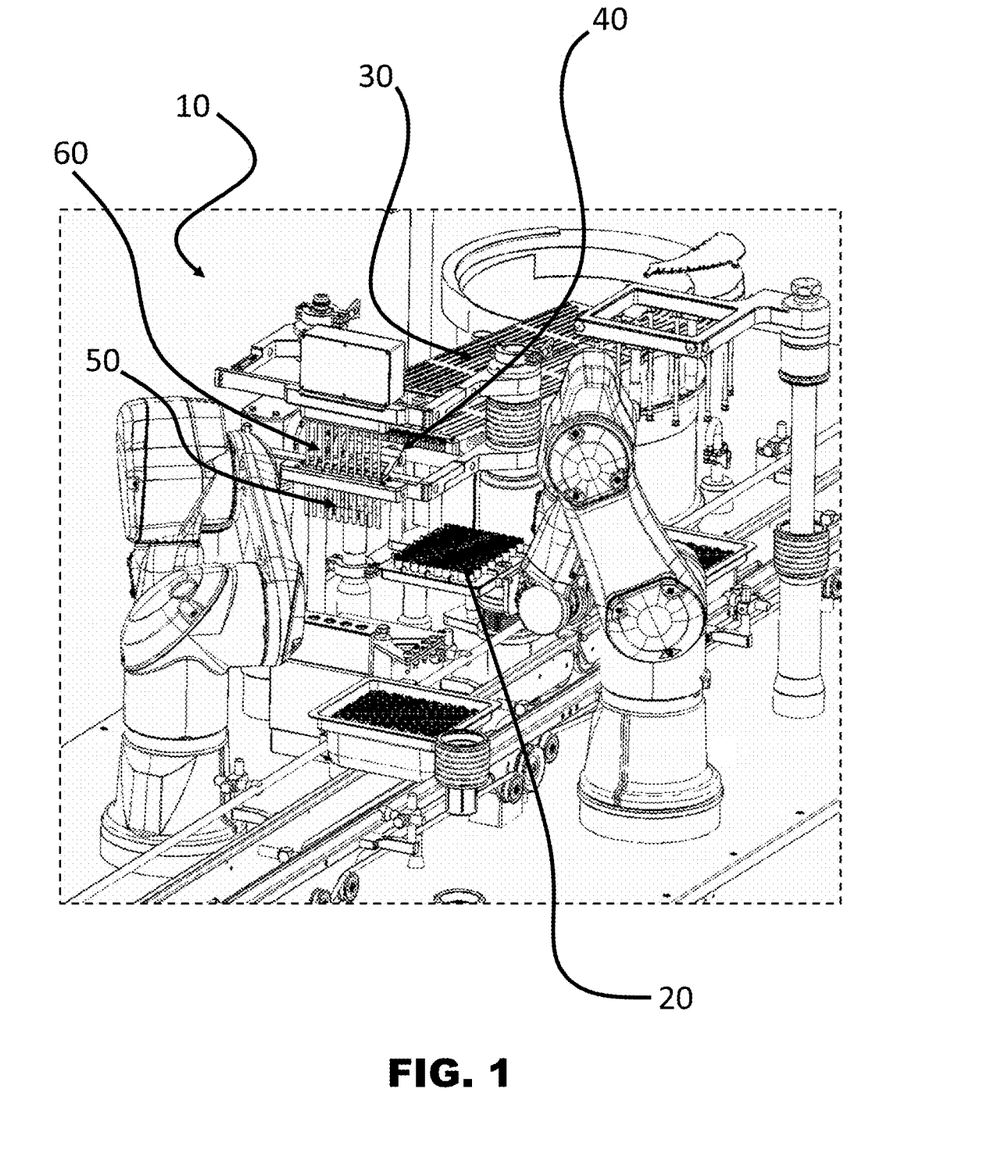
FIG. 1 shows a perspective view of an electromechanical apparatus for installing a plunger tip in a syringe.

FIG. 1 shows a perspective view of an electromechanical apparatus 10 for installing a plunger tip in a syringe.

The electromechanical apparatus 10 comprises several devices and components which are integrated therein, to provide several functions. For sake of brevity, only the components of the apparatus 10 which are involved in corking the container with a bung element will be described in detail in the following. Other functions and components of the apparatus 10 may be present in certain embodiments.

Preferably, the syringe is a pre-sterilized pharmaceutical container, provided on a tray support 20 with a plurality of housings for a respective plurality of syringes. The tray support 20, for example of the nest-and-tub kind, is preferably handled by a robotic arm.

Preferably, the plunger tips are supplied on a linear track 30 which is preferably a vibrating linear track.

Preferably, the plunger tips are overturned of 180° by a revolving tool 40 to bring them to the respective syringes.

In the case of pharmaceutical containers being syringes, the bung elements are plunger tips brought to a cannula element 50 which descends and enters the syringe at the final position of the plunger tip, and a pusher rod 60 pushes the plunger tip from above, as it will be further described.

Figure 2:
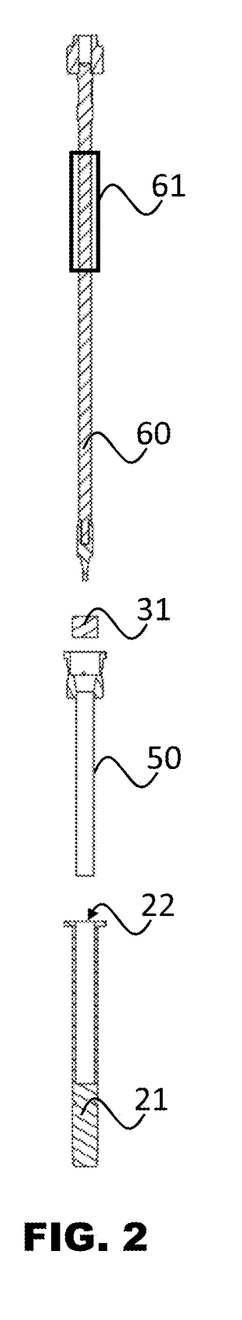
FIG. 2 shows an exemplary embodiment of a pusher rod associated to a syringe.

FIG. 2 shows an exemplary embodiment of a pusher rod 60 associated to a syringe 21.

A syringe 21 is a pharmaceutical container which comprises at least one opening 22; especially in the case of a syringe a further opening (not shown) is provided corresponding to a needle's position.

A bung element such as a plunger tip 31 is provided, which is configured for snug insertion in the opening 22 in its final position. The plunger tip 31 thus represents a corking element of the pharmaceutical container.

The plunger tip 31 is pushed at least partially inside the syringe 21 by a pusher rod 60 of the electromechanical apparatus 10.

The control method provides for monitoring over time a force exchanged between the plunger tip 31 and the pusher rod 60, providing a force signal measured by a force detector 61 operatively connected to the electromechanical apparatus 10.

As it will be further described, the force signal, measured by the force detector 61 relating to the force exchanged between the plunger tip 31 and the pusher rod 60, is analyzed to determine an installation status of the plunger tip 31 in the syringe 21.

The force exchanged between the plunger tip 31 and the pusher rod 60, due to the third law of motion, corresponds to the force exchanged between the plunger tip 31 and the intermediate cannula element 50, or in general to the force exchanged between the bung element and the container in which the former is inserted.

In this sense, the force signal relating to the force exchanged between the plunger tip 31 and the pusher rod 60 also depicts the physical quantity of interest, i.e., the force exchanged between the plunger tip 31 and the cannula element 50 which represents the load acting on the plunger tip 31 during insertion thereof, useful to determine its installation status, as it will be further described.

To appropriately measure the force exchanged between the plunger tip 31 and the pusher rod 60, the force detector 61 shall provide sufficient frequency response, resolution and accuracy.

In a preferred embodiment, the force detector 61 is based on an indirect deformation measurement, estimating the force exerted by the pusher rod 60 by measuring the compressive deformation of the pusher rod 60 itself.

Given the extent of deformations involved in the pusher rod 60, the force detector 61 preferably comprises semiconductor strain gauges that guarantee a significantly higher calibration coefficient than electrical resistance strain gauges.

In particular, four strain gauges are installed in the force detector 61 on each pusher rod 60. The four strain gauges are mounted on a Wheatstone bridge circuit optimized for compression measurement, so that a first pair of strain gauges opposite in the circuit will be placed on the axis of maximum deformation of the pusher rod 60, while a second pair of strain gauges opposite in the circuit will be positioned perpendicular to the first pair of strain gauges, preferably in a position of minimum deformation of the pusher rod 60.

The signal generated by the force detector 61 is preferably acquired by a system of suitable characteristics, in particular having suitable resolution (preferably at least 16 bits), suitable sampling frequency of at least 200 Hz, suitable bandwidth of at least 1 kHz.

In general, the force detector 61 is provided in the pusher rod 60, in particular on the elongated body thereof. Preferably, the force detector 61 detects a compressive strain of the pusher rod 60, to determine the force exchanged by the pusher rod 60 and the plunger tip 31.

Figure 3:
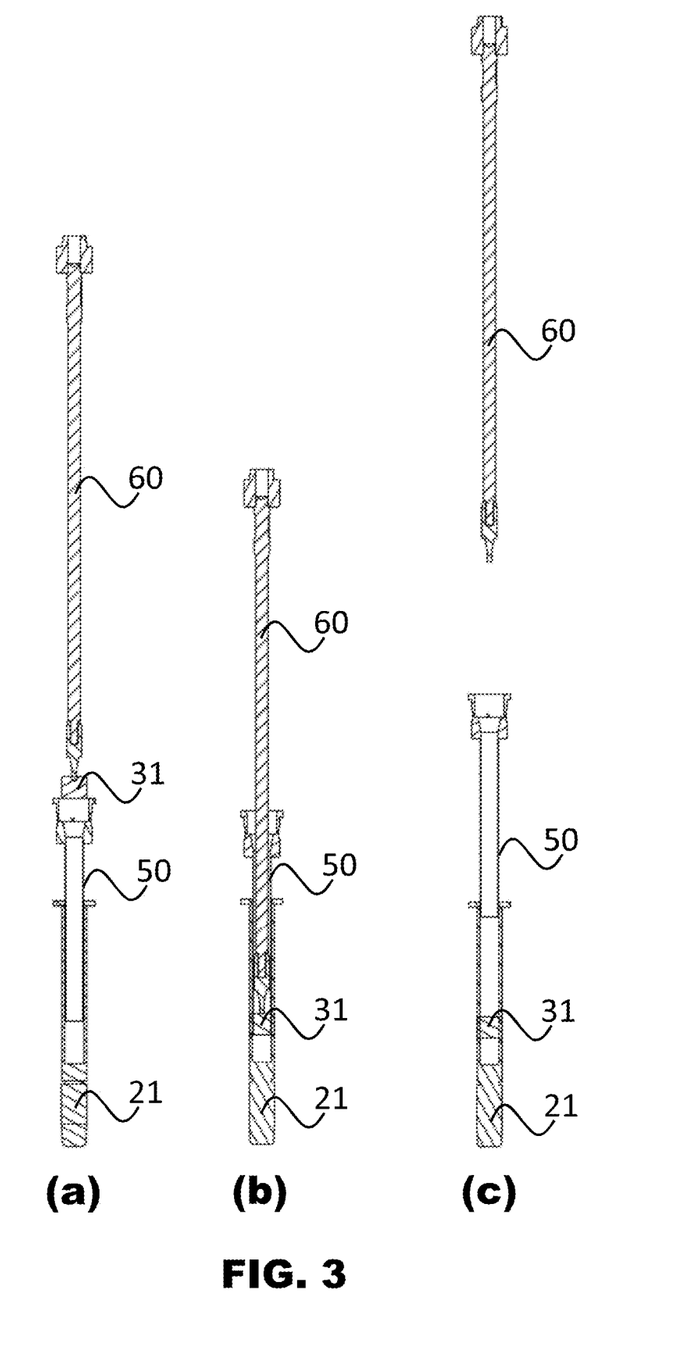
FIG. 3 shows an installation process of a plunger tip on a syringe.

FIG. 3 shows an installation process of a plunger tip 31 on a syringe 21.

In this embodiment, the pharmaceutical container is a syringe 21, and the bung element is a plunger tip 31.

The plunger tip 31 is pushed inside the syringe 21 passing through an intermediate cannula element 50.

The intermediate cannula element 50 is at least partially inserted in the opening of the syringe 21, as seen in view (a) of FIG. 3.

Then the plunger tip 31 is pushed inside the intermediate cannula element 50 by the pusher rod 60, while force exchanged is detected by the force detector, as seen in view (b) of FIG. 3.

While the pusher rod 60 is maintained in its current position, engaging the plunger tip 31, the cannula element 50 is slightly retracted out of the syringe 21 so as to release the plunger tip 31 in its final position inside the syringe 21.

Both the pusher rod 60 and the cannula element 50 are then completely retracted outside of the syringe 21 and removed, once the plunger tip 31 is installed in its final position, as seen in view (c) of FIG. 3.

Figure 4:
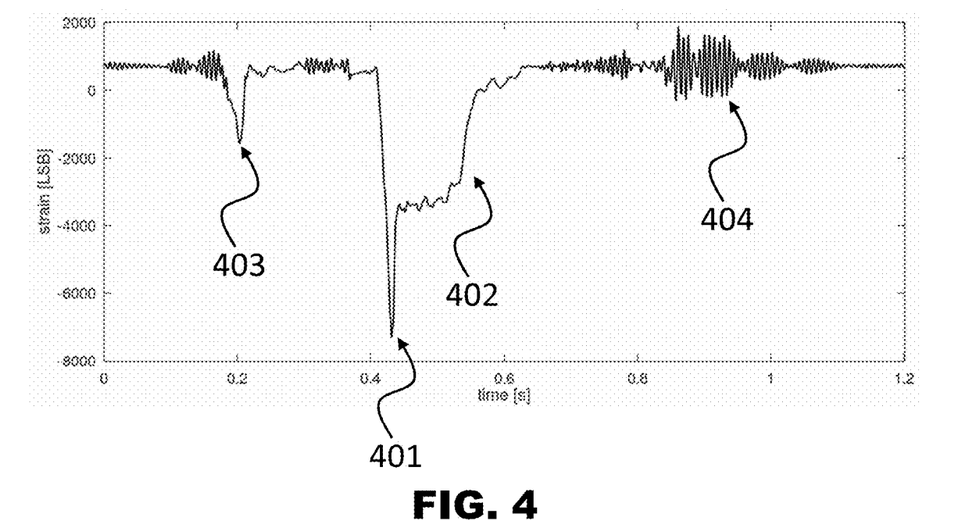
FIG. 4 shows a force-over-time plot during a successful insertion of a plunger tip in a syringe.

FIG. 4 shows a force-over-time plot during a successful insertion of a plunger tip in a syringe.

Time is expressed in seconds in the abscissa axis, and force is expressed as an arbitrary strain measurement on the ordinate axis. As it will be clear, it is more important to detect force variations rather than actual force magnitudes.

Figure 5:
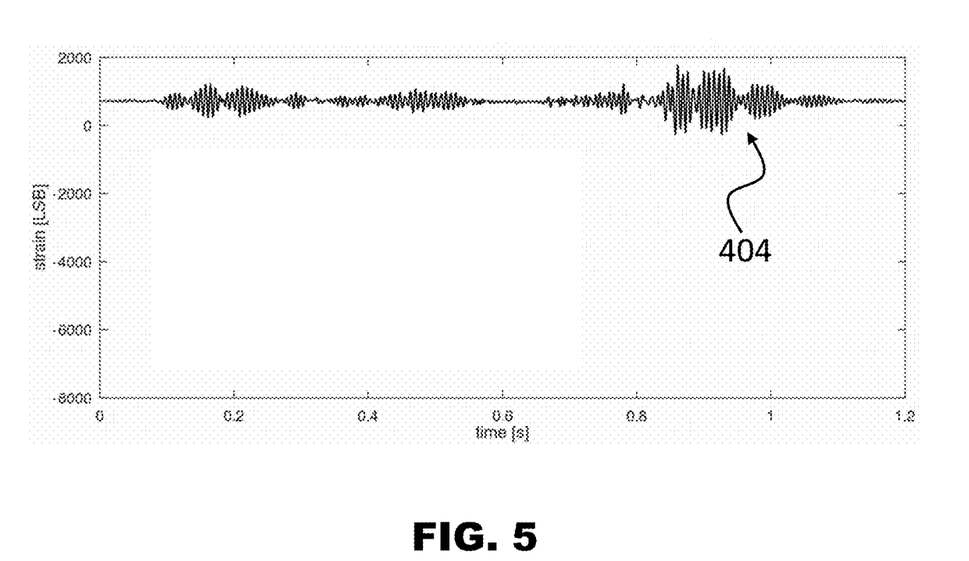
FIG. 5 shows a force-over-time plot during an unsuccessful insertion of a plunger tip in a syringe.

In the examples of FIGS. 4 and 5, an experimental setup as described with reference to FIG. 2 has been employed, and particularly semi-conductor strain gauges were applied to the pusher rod.

In order to properly detect the force exchanged between the plunger tip and the pusher rod, an analog-to-digital (A/D) conversion system is used, capable of managing the bridge circuit and converting the data into digital format. Once the data has been converted, it is preferably passed to a computer on which a suitably developed software is installed, able to analyze the force signal and implement different analysis strategies that allow to identify the presence of the plunger tip. For example, the digitalized data can be transferred according to an Ethernet (TCP/IP) protocol or to a USB protocol, or by other suitable protocols.

Once the analysis of the force signal has been carried out, the computer determines an installation status of the plunger tip in the syringe and provides the electromechanical apparatus with information related to the quality of the corking process, for each cycle of the overall process.

Preferably, analyzing the force signal comprises detecting a force peak 401, corresponding to static friction associated to a first insertion of the plunger tip pushed by the pusher rod.

Preferably, analyzing the force signal comprises detecting a decreasing force 402 corresponding to dynamic friction associated to a movement of the plunger tip pushed by the pusher rod.

Preferably, analyzing the force signal comprises detecting an initial impulse 403 corresponding to initial contact of the pusher rod with the plunger tip.

In general, analyzing the force signal comprises determining at least a partial duration of the force, for example associated to the first insertion of the plunger tip, to the movement of the plunger tip, or to initial contact of the pusher rod with the plunger tip.

As mentioned, by observing the force signal of FIG. 4, the following phases can be identified.

At reference 403, it is identified a first impact with the plunger tip, appearing as a slight initial compression that wears out almost immediately. At this time, the plunger tip is at the entrance of the cannula element.

At reference 401, a static friction compression peak, needed to overcome static friction and insert the plunger tip into the cannula element.

At reference 402, it is identified dynamic friction and plunger tip exit from the cannula element; it requires lesser force, and therefore lesser strain on the pusher rod. The plunger tip stroke along the cannula element is very noisy and very variable, for example due to slide-and-grip effects. Eventually, the plunger tip breaks free, and the stress state follows some random oscillation and returns to the equilibrium state.

At reference 404, it is identified the return phase of the pusher rod presents vibrations at about 150 Hz without any force bias since the tip of the pusher rod is no longer in contact with anything.

Depending on the specific type of plunger tip, further controls can be implemented by analyzing the force diagram, such as: exceeding of a force threshold, verification of the presence of a certain wave form, use of machine learning for the identification of a reject signal.

FIG. 5 shows a force-over-time plot analogous to FIG. 4, but in this case showing the force detected during an unsuccessful insertion of a plunger tip in a syringe.

In the example of FIG. 5, the plunger tip was not present so that no interaction with the pusher rod was possible. As it can be seen, no substantial force is exchanged between the pusher rod and the plunger tip (which is absent) and only the return phase 404 coincides with the example of FIG. 4.

By analyzing the force signal of the force exchanged between the plunger tip and the pusher rod, it becomes thus possible to determine an installation status of the plunger tip in the syringe.

In particular, the plunger tip's installation status concerns at least one of: plunger tip presence, plunger tip alignment, plunger tip maximum pushing force.

This installation status is in particular determined by a processor device, such as a computer, associated to the electromechanical apparatus.

The present invention provides for a method wherein an implementation of an analysis strategy of the acquired force signal allows identification of various stages of insertion of the bung element such as a plunger tip into a pharmaceutical container such as a syringe.

Preferably, a control signal representing the corking outcome is generated and used by the electromechanical apparatus.

In a preferred embodiment, the control is provided by an analysis of the amplitude of a static friction peak 401. However, other controls can be implemented from the same force signal. Here are some non-limiting examples: duration of the dynamic friction phase 402; shape of the overall signal; applied energy.

In an embodiment, machine learning can be employed for the recognition of features in the force signals.

Figure 6:
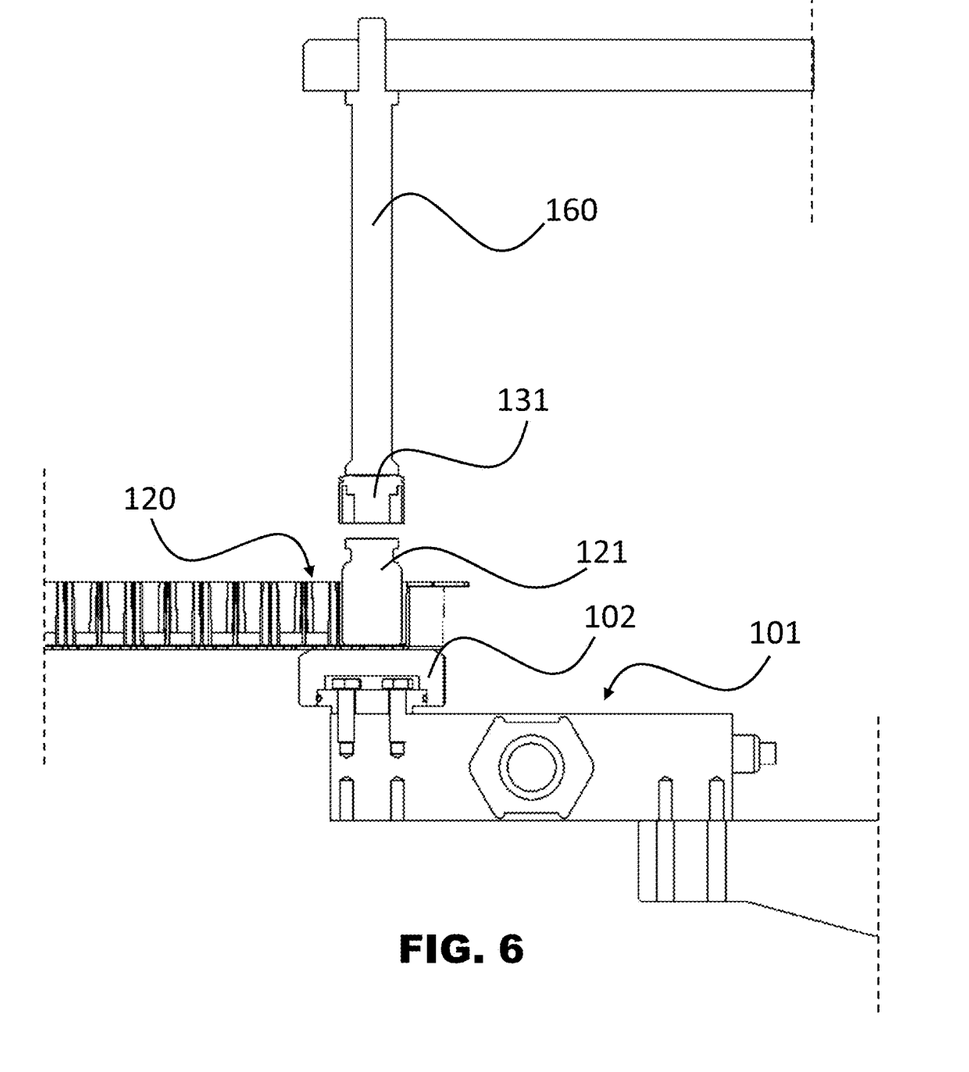
FIG. 6 shows a further example of a pusher rod for installing a bung element in a pharmaceutical container.

FIG. 6 shows a further example of a pusher rod 160 associated to a pharmaceutical container 121.

In examples, the pharmaceutical containers can be containers, cartridges and others. In examples, the bung elements can be a corks or stoppers.

In this example, a load cell 101 is used to measure the force exerted by the pusher rod 160 for corking a pre-sterilized container 121. The container 121 is a bottle, placed in a nest tray 120 above a load cell 101 with an interposed bearing element 102. The pusher rod 160 descends and corks the container 121 with the bung element 131. The load cell 101 measures the force exchanged by the bung element 131 and the pusher rod 160, which is transmitted at the base of the container 121 and, via the interposed bearing element 102, to the load cell 101.

Once again, if the force detected and measured reaches a certain threshold it means that: the bung element 131 is present and/or the container 121 has been properly closed. In general, the force signal can be analyzed as previously disclosed.

Therefore, an exemplary control method of the electromechanical apparatus provides a pharmaceutical container 121 comprising at least one opening. A bung element 131 is provided, which is configured for snug insertion in the opening. The bung element 131 is pushed at least partially inside the pharmaceutical container 121, by a pusher rod 160 of the electromechanical apparatus. A force exchanged between the bung element 131 and the pusher rod 160 is monitored over time, providing a force signal by a force detector 101, 102 of the electromechanical apparatus. The force detector 101, 102 comprises a load cell 101 associated to the pharmaceutical container 121. The force signal is analyzed to determine an installation status of the bung element 131 in the pharmaceutical container 121.

INDUSTRIAL APPLICABILITY

In general, the control method of the present invention provides for sensorized elements of the electromechanical apparatus configured for monitoring a force exchanged during installation of the bung element such as a plunger tip, to determine an installation status in the pharmaceutical container such as a syringe.

By measuring, monitoring and analyzing the exchanged force it is possible to identify the presence of the bung element, to characterize the sliding of the bung element in the container or in the cannula element, and to determine the correct closing of the pharmaceutical container.

The control method of the present invention allows not only to establish if a bung element is present, but also: if the correct closing force has been applied, if the bung has entered the container in a crooked/upside down state, or straight in a straight condition; the centering between the pusher rod and the cannula element is correct.

In general, the present invention allows to define a quality of corking of a pharmaceutical container, such as a syringe, with a bung element, such as a plunger tip.

In particular, the control method of the present invention is embodied in an electromechanical apparatus configured for installing an element in a syringe, and preferably configured for further tasks which are optional for the present invention.

Although the present invention has been described in considerable detail with reference to certain preferred embodiments thereof, other variants may become apparent to those skilled in the art who consider the present description.

For example, the pharmaceutical container can be of different shape and sizes. For example, the bung element can vary depending on the container to which it is associated.

For example, the configuration and elements of the force detector may vary as the skilled in the art can devise alternative for detecting the force exchanged between the bung element and the pusher rod.

For example, the pusher rod can be a more or less elongated element, configured for pushing the bung element.

The embodiments disclosed herein are thus non-limiting examples of the present invention.

The invention claimed is:

1. A control method of an electromechanical apparatus for installing a plunger tip in a syringe, the control method comprising:
    providing the syringe comprising at least one opening;
    providing the plunger tip configured for snug insertion in said at least one opening;
    pushing said plunger tip inside said syringe, by a pusher rod of said electromechanical apparatus, said plunger tip passing through an intermediate cannula element;
    monitoring over time a force exchanged between said plunger tip and said pusher rod, providing a force signal by a force detector of said electromechanical apparatus;
    analyzing said force signal to determine an installation status of said plunger tip in said syringe.

2. The control method according to claim 1, wherein said intermediate cannula element is at least partially inserted in said at least one opening of said syringe, and then said intermediate cannula element is at least partially retracted outside said syringe while said pusher rod is maintained in [[its]] a current position, so as to release said plunger tip in its final position.

3. The control method according to claim 1, wherein said installation status of said plunger tip concerns at least one of: plunger tip presence, plunger tip alignment, plunger tip maximum pushing force; said installation status being determined by a processor device of said electromechanical apparatus.

4. The control method according to claim 1, wherein analyzing said force signal comprises detecting a force peak corresponding to static friction associated to a first insertion of said plunger tip pushed by said pusher rod inside said intermediate cannula element.

5. The control method according to claim 1, wherein analyzing said force signal comprises detecting a decreasing force corresponding to dynamic friction associated to a movement of said plunger tip pushed by said pusher rod along said intermediate cannula element.

6. The control method according to claim 1, wherein analyzing said force signal comprises detecting an initial impulse corresponding to initial contact of said pusher rod with said plunger tip at an entrance of said intermediate cannula element.

7. The control method according to claim 1, wherein analyzing said force signal comprises determining at least a partial duration of said force.

8. The control method according to claim 1, wherein said force detector is provided on an elongated body of said pusher rod.

9. The control method according to claim 8, wherein said force detector detects a compressive strain of said pusher rod, to determine said force.

10. The control method according to claim 9, wherein said force detector comprises semiconductor strain gauges applied to said pusher rod.

11. The control method according to claim 1, wherein monitoring over time said force comprises monitoring a force with an acquisition frequency of at least 200 Hz.

12. The control method according to claim 1, wherein monitoring over time said force comprises monitoring a force with an acquisition bandwidth of at least 1 kHz.

13. The control method according to claim 1, wherein said pusher rod passes inside said intermediate cannula element during pushing said plunger tip inside said syringe.

14. The control method according to claim 1, wherein said intermediate cannula element descends and enters said syringe at a final position of said plunger tip, and wherein said pusher rod pushes said plunger tip from above.

15. The control method according to claim 1, wherein said syringe is a pre-sterilized syringe, and wherein providing said syringe comprises providing a tray support with a plurality of housings for a respective plurality of syringes.

16. The control method according to claim 1, wherein providing said plunger tip comprises supplying said plunger tip on a linear track and overturning said plunger tip by a revolving tool to bring it to said syringe.

\* \* \* \* \*